June 24, 1969  L. J. LAPOINTE ET AL  3,451,916
APPARATUS FOR MANUFACTURING PRINT HEADS
Filed Feb. 17, 1966
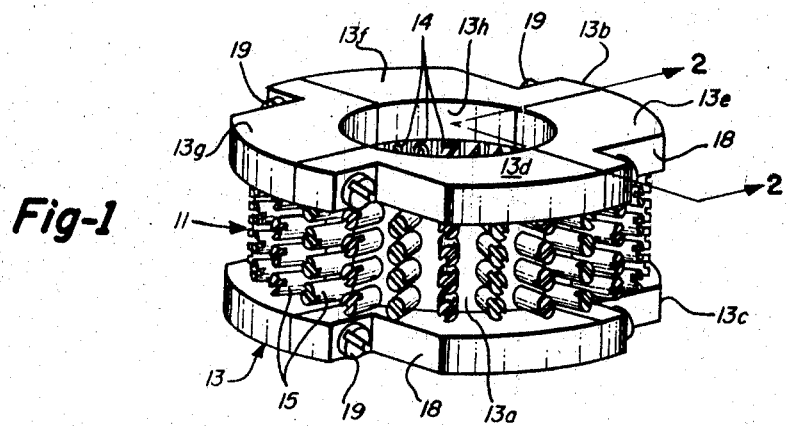
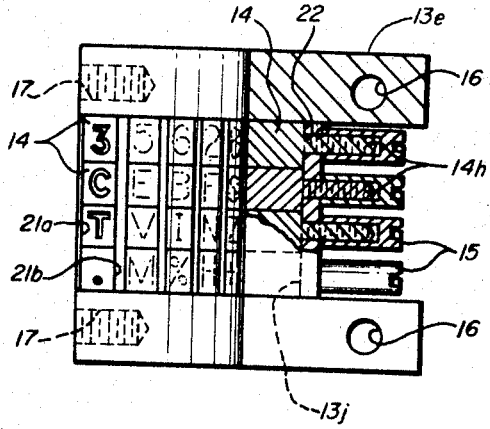
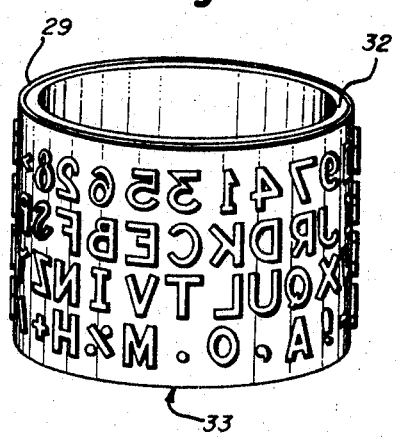
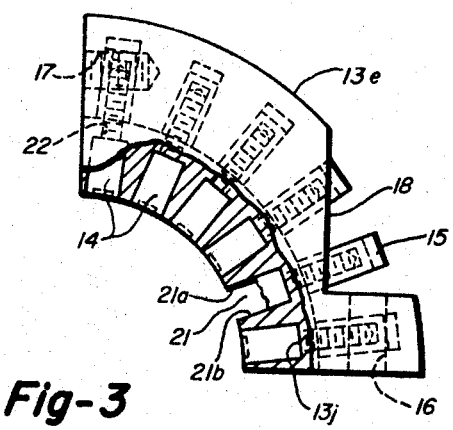
INVENTORS
LLOYD J. LAPOINTE
RALPH L. PARKER
BY Thomas S. Ross
Edward H. Loveman
ATTORNEYS

INVENTORS
LLOYD J. LAPOINTE
RALPH L. PARKER

BY
ATTORNEYS

United States Patent Office 3,451,916
Patented June 24, 1969

3,451,916
APPARATUS FOR MANUFACTURING PRINT HEADS

Lloyd J. Lapointe, West Hartford, and Ralph L. Parker, Rockville, Conn., assignors to Royal Typewriter Company, Inc., a corporation of Delaware
Filed Feb. 17, 1966, Ser. No. 528,283
Int. Cl. C23b 7/08
U.S. Cl. 204—281        3 Claims

ABSTRACT OF THE DISCLOSURE

A master die for molding single element print heads having a hollow cylindrical housing segmented into a number of pie shaped sections and a plurality of individual replaceable type slugs arranged in a desired pattern of rows and columns in the housing assembly, and a process of electroforming an intermediate die element from the master die, and electroforming a production die matrix from the intermediate die element. A cylinder wall of the production die matrix axially split between two columns of characters is expanded and separated from the die element and then adjusted to coincide with the dimensions of the bore of the master die whereby a production print head electroformed or molded from the production die matrix may be readily disassembled therefrom by outwardly expanding the sides of the production matrix and removing the print head.

---

This invention relates to printing apparatus and methods for producing printing apparatus, and more particularly relates to a method and apparatus for manufacturing type for typewriting machines; and more specifically relates to method and apparatus for forming single element print heads for matrix typewriters.

Single element print heads have been used in typewriters since the turn of the century, however the methods and apparatus used for casting such print heads have not changed very much and generally follow the techniques and processes developed at that time. The master die for casting or molding the print heads is generally manufactured in an integral unit such that if it is desired to change the pattern of rows or columns of characters or change even one character, it is necessary to manufacture a new die which, of course, is both costly and time consuming. Furthermore, if the print head is cast from a non-metallic material and thereafter plated with a metal in order to increase its life, the shape of the embossed mirror image characters become distorted, inasmuch as the thickness of the plating on the surface of the characters cannot be uniformly controlled. Moreover, the likelihood of damaging or ruining the master die is greatly increased during the mass production molding of print heads. Therefore, a quick and ecomonical apparatus and method for molding both individual and mass produced typewriter print heads is highly desirable.

In accordance with the present invention a hollow cylindrical housing is segmented into a number of pie shaped sections and then assembled together forming a common bore. A plurality of individual replaceable type slugs, having recessed characters on one face, are installed in the housing assembly to constitute a master die. The type slugs are arranged in a desired pattern of rows and columns, with the faces having the characters arranged flush with the bore of the master die. An infinitely large variety of character patterns and all sorts of different characters may be easily substituted on the master die and a finished typewriter print head electroformed or molded therefrom. In mass production of print heads, the die is protected from damage, in accordance with the invention, by electroforming an intermediate die element from the master die, and electroforming a production die matrix from this intermediate die element. Subsequently, the production matrix cylindrical wall is axially slit between two columns of characters, expanded and separated from the die element which is discarded. The inner cylindrical diameter of the production matrix is then adjusted to have the same dimension as that of the bore of the master die. Thereafter, a production print head electroformed or molded from the production die matrix is readily disassembled therefrom, by simply outwardly expanding the sides of the production matrix at the slit and removing the print head.

Accordingly, an object of the invention is to provide a master die assembly with easily replaceable characters.

Another object of the invention is in the provision of a novel method for assembling a master die assembly for producing single element typewriter print heads.

Still another object of the invention is in the provision of a novel method of producing a production die matrix.

A further object of the invention is in the provision of a production matrix which may be easily separated from a molding.

Still another object is in the provision of a novel method for manufacturing print heads from a production die matrix.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 1 is a perspective view of the novel die assembly used to manufacture typewriter print heads.

FIGURE 2 is a view taken along the line 2—2 of FIGURE 1.

FIGURE 3 is a top view of FIGURE 2.

FIGURE 4 is a perspective view of a finished typewriter print head.

Figure 6:
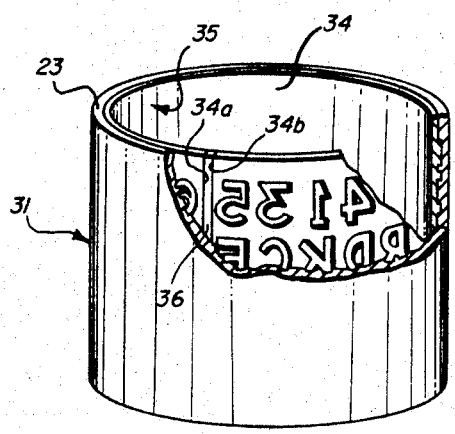
FIGURE 6 is a perspective view of an intermediate die element and a production die matrix electroformed thereon in accordance with the invention.

Referring now to the drawings wherein like reference characters designate like or corresponding parts throughout the several views, there is shown in FIGURE 1 a master die assembly generally indicated at 11 which is used as a master mold for casting single element typewriter print heads. Die 11 is comprised of a housing assembly generally designated by reference numeral 13, a plurality of type slugs 14, type slug hold down nuts 15, and assembly bolts 19. Housing assembly 13 consists of a cylindrical body section 13a, to which is fastened by welding or other conventional fastening means, upper and lower end flanges 13b and 13c. The housing assembly is accurately segmented into radial pie shaped quadrants 13d, 13e, 13f and 13g respectively, and when assembled together, the quadrants form a common bore 13h which is equal to the outer cylindrical diameter of a finished print head 29 (FIGURE 4). In order to fasten the quadrants together, a hole 16 is drilled into each upper and lower flange at both ends of each quadrant (FIGURE 2), and the holes at alternate ends are tapped for a conventional screw thread 17 (FIGURE 3). A notch 18 (FIGURE 3) is machined into each upper and lower flange, near the quadrant ends which contain untapped holes, to permit installation of assembly bolts 19.

Figure 5:
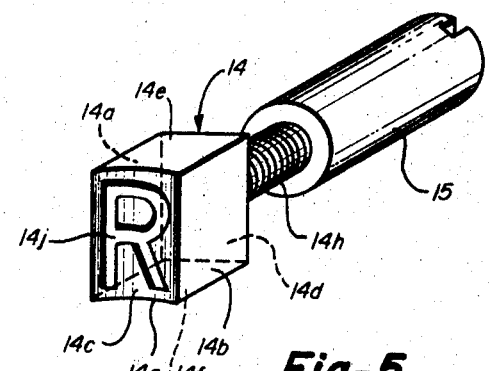
FIGURE 5 is a perspective view of a typical character and hold down nut.

After housing quadrants 13d through 13g respectively, are assembled and fastened together with bolts 19, bore 13h is milled with a multiplicity of vertical slots 21 equivalent to the number of columns in the pattern desired on print head 29. Each slot width (distance between faces 21a and 21b) is milled to be slightly larger than the type slug width (distance between faces 14a and 14b, FIGURE 5) and each slot depth (distance between bore 13h and an end wall 12j) is milled to be equal to the type slug depth (distance between faces 14c and 14d). After this milling operation, a plurality of holes 22 are drilled in the center of each slot through end wall 13j, in as many vertical locations as there are rows in the pattern desired on print head 29. Since it is easier to accurately machine the type slug faces, to obtain proper vertical spacing of the type slugs within the vertical solts 21, than it is to accurately drill the holes 22 in end wall 13j, the holes 22 can be drilled slightly larger than the diameter of the type slug shanks 14h. Thus accurate vertical assembly of the type slugs can be had in housing assembly 13, without the necessity of accurate placement of said holes 22 in said end wall 13j.

A recessed character, for example 14j, is machined on each type slug face 14c, and then faces 14a through 14f are ground to their respective dimensions. In addition, an arc 14g is hobbed in face 14c in order to facilitate removal of subsequent print heads. Type slug shank 14h, which is fastened to face 14d of type slug 14, is threaded with a conventional screw thread for mating with threads in hold down nuts 15.

Type slugs 14 are installed in slots 21 in housing assembly 13 according to the pattern desired on finished print head 29. Due to the clearance provided between holes 22 and the threaded shanks 14h of the type slugs, said slugs are installed from the bottom up with each ascending type slug supporting the one directly above. After a column of type slugs are installed in housing 13, hold down nuts 15 are then threaded to each shank 14h to prevent said type slugs 14 from moving inwardly.

The outer diameter of housing flanges 13b and 13c extend outwardly beyond hold down nuts 15, and act as supporting members, for a material (not shown) which is poured around the nuts to seal and protect them from an electroplating bath. This material, which is also placed around flanges 13b and 13c, may be a low temperature melting plastic, ceramic, solder type metal, room temperature curing rubber compound or any other convenient material known in the art, which will mask particular areas from the electroplating process. After this protective treatment, master die assembly 11 is placed in a nickel plating solution until electrofabrication produces a cylinder 29 with a .005" thick wall. Master die assembly 11 is then removed from the plating solution and placed in a plastic molding machine. An inner liner 32 of plastic material (approximately 0.040" thick) is molded to the inner diameter of the electroformed cylinder 29 to give rigidity to said cylinder and also provide a uniform and accurate inside diameter for print head assembly 33. Thereafter, master die assembly 11 is disassembled from the finished print head 33 by removal of assembly bolt 19.

In order to prevent damage to master die assembly 11, in the mass production of print heads 33, an intermediate electroformed die element 34 (FIGURE 6) is created from master die assembly 11. This die element is exactly the same as the print head 29 (FIGURE 4) previously formed, except in this case a thicker nickel cylindrical wall is formed (approximately 0.020) and thus plastic liner 32 is not needed. Die element 34 is slit between two columns of embossed charatcers parallel to the longitudinal axis of the cylinder. A piece of material 36, twice the thickness of the material which was removed by the slitting process, is inserted into the slot left thereby, as shown in FIGURE 6. The added material 36 which may be brass, lead, etc., enlarges the diameter of the cylinder, and is fastened to each side 34a and 34b of the slot by epoxy, solder or other suitable means well known in the art.

Figure 7:
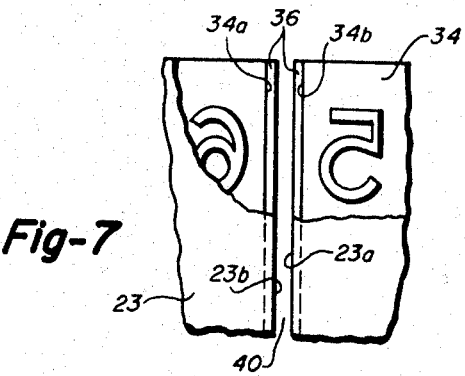
FIGURE 7 is an enlarged fragmentary view of the walls of the intermediate die element and production die matrix after slitting in accordance with the invention.

The modified intermediate die element 35 is now used to electroform a .040" thick production die matrix 23 (FIGURE 6) and this assembly 31 when removed from the plating bath is slit midway between sides 34a and 34b through both material 36 and the wall of production die matrix 23 thereby forming sides 23a and 23b as shown in FIGURE 7. Production die matrix 23 is separated from the inner modified element 35 by expanding outwardly each side 23a and 23b of master matrix 23, and discarding modified element 35. Production matrix 23 is now a replica of master die assembly 11 except for the slit or separation 40 (FIGURE 7). Therefore, production matrix 23 is installed into a shell 24 which compresses production matrix 23 such that sides 23a and 23b contact one another (FIGURE 8) and the inner cylindrical diameter of production matrix 23 conforms to the bore 13h of master die assembly 11.

Figure 8:
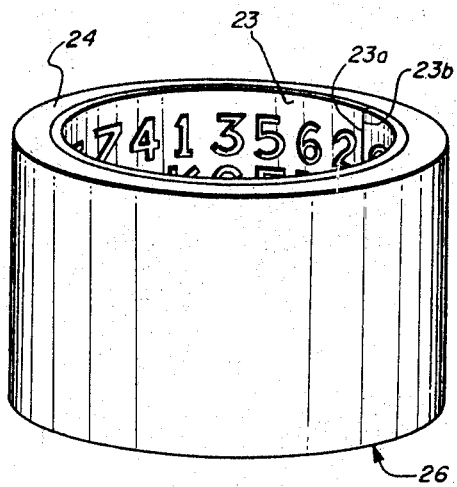
FIGURE 8 is a perspective view of a production matrix assembly for mass producing typewriter print heads.

Thereafter, in mass production of print heads, the production matrix and shell assembly 26 of FIGURE 8 is placed into an electroplating bath until a .005" thick cylinder is formed, which is exactly the same as cylinder 29 of FIGURE 4. An inner lining of plastic, which is the same as lining 32 in FIGURE 4, is molded to the electroformed cylinder, and outer shell 24 is then removed from production matrix 23. As a final step, production matrix sides 23a and 23b are expanded outwardly to separate production matrix 23 from the completed print head which is the same as print head 33 of FIGURE 4. If desired, production matrix and shell assembly 26 may be used in a standard plastic compression or transfer molding process to mold plastic print heads. The finished print heads are separated from production matrix and shell assembly 26, as in the previously explained electroformed print head process, by removing shell 24 and expanding outwardly production matrix sides 23a and 23b.

Figure 9:
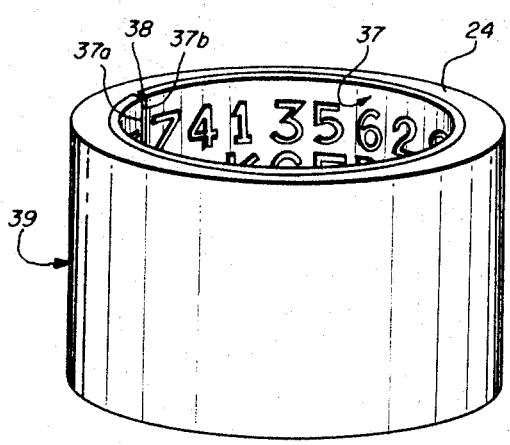
FIGURE 9 is a perspective view of another embodiment of a production matrix assembly for mass producing typewriter print heads.

An alternate method of producing the production matrix is to electroform it directly from die element 34 rather than electroforming it from assembly 35 as described above. In this case, the assembly, die element 34 and the electroformed production matrix 37 (not shown) is slit midway between two columns of characters and separated. If production matrix slit sides 37a and 37b (FIGURE 9) were now brought together, the inner cylindrical diameter would be smaller than the bore of master die assembly 11, by the amount of material removed during the slitting operation. Consequently, a piece of material 38 whose thickness is equivalent to that removed by the slitting operation, is fastened to the inner diameter of shell 24 so that it protrudes inwardly. This shell assembly 39 is slipped over the outer diameter of production matrix 37, with material 38 firmly positioned between slit sides 37a and 37b of production matrix 37 (as shown in FIGURE 8), so that the inner cylindrical diameter of production matrix 37 conforms to that of master die assembly 11. Thereafter the process of forming production print heads is the same as previously described with production matrix and shell assembly 26.

It should be understood that the foregoing disclosure relates to only a preferred embodiment of the invention and that it is intended to cover all changes and modifications of the example of the invention herein chosen for the purposes of the disclosure which do not constitute departtures from the spirit and scope of the invention.

The invention claimed is:
1. A master die for molding single element print heads having a mirror image of a plurality of characters arranged in a desired fixed pattern of rows and columns embossed on the outer surface comprising,
  a plurality of arcuate segments adapted to be assem- bled into a hollow cylindrical housing having a common bore equal to the outer cylindrical diameter of said print head, said segments having slug receiving openings, fastening means engaging and securing said segments together to form said housing and common bore, a plurality of replaceable type slugs each having a face with at least one character recessed thereon, said type slugs being installed in said openings with said faces flush with said bore and in said pattern of rows and columns, and means fastened to said type slugs and engaging said housing assembly thereby preventing motion of said type slugs relative to said housing assembly.

2. Apparatus in accordance with claim 1 wherein said housing assembly further includes a plurality of vertical walls in said bore for separating adjacent columns of type slugs.

3. Apparatus in accordance with claim 1 wherein each type slug in said column above the lowest type slug engages the type slug below and is vertically supported by said engagement.

References Cited

UNITED STATES PATENTS 1,002,258   9/1911   Gibbs _____ 204—281

FOREIGN PATENTS 10,720   1884   Great Britain.

JOHN H. MACK, *Primary Examiner.*

T. TUFARIELLO, *Assistant Examiner.*

U.S. Cl. X.R.

204—9

PO-1050
(5/69)

UNITED STATES PATENT OFFICE
CERTIFICATE OF CORRECTION

Patent No. 3,451,916            Dated   June 24, 1969

Inventor(s)   Lloyd J. Lapointe and Ralph L. Parker

It is certified that error appears in the above-identified patent and that said Letters Patent are hereby corrected as shown below:

In the heading, the assignee should be:

---Litton Business Systems, Inc., a corporation of New York---.

SIGNED AND
SEALED
MAY 26 1970

(SEAL)
Attest:

Edward M. Fletcher, Jr.
Attesting Officer

WILLIAM E. SCHUYLER, JR.
Commissioner of Patents